Oct. 14, 1947.　　　H. WAYMOUTH　　　2,428,898
ELECTRICAL CONDENSER FOR LIQUID VOLUME INDICATORS
Filed Dec. 30, 1944　　　3 Sheets-Sheet 3
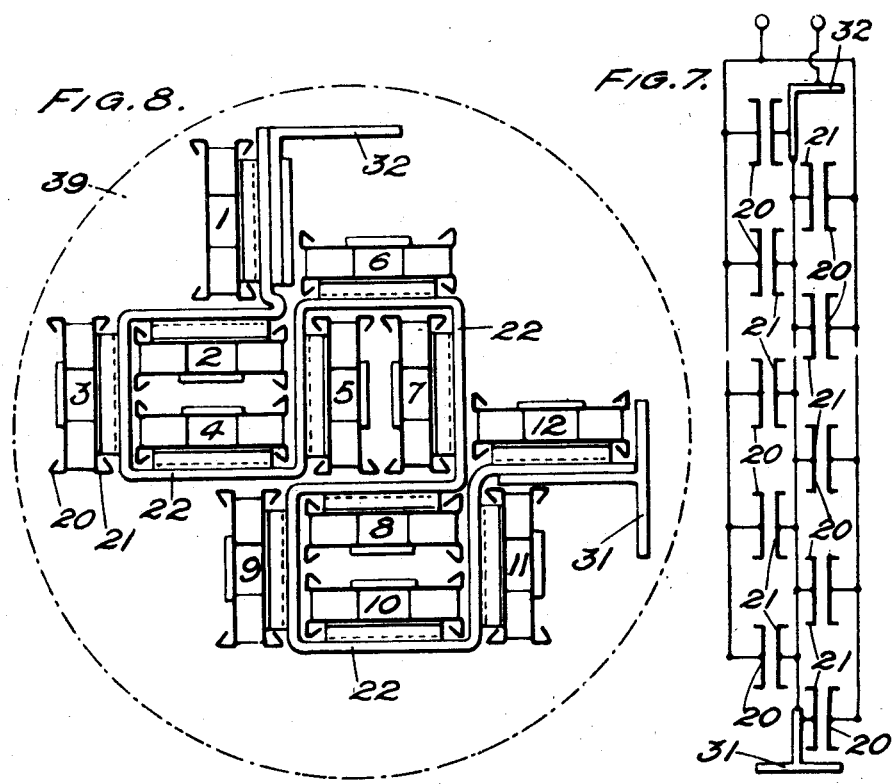
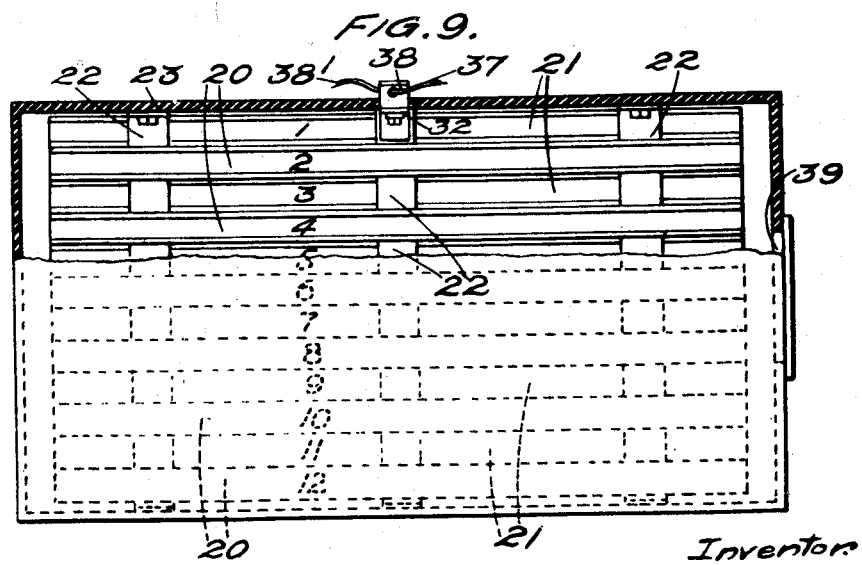
Inventor
Henry Waymouth
By Stevens and Davis
his Attorneys Patented Oct. 14, 1947

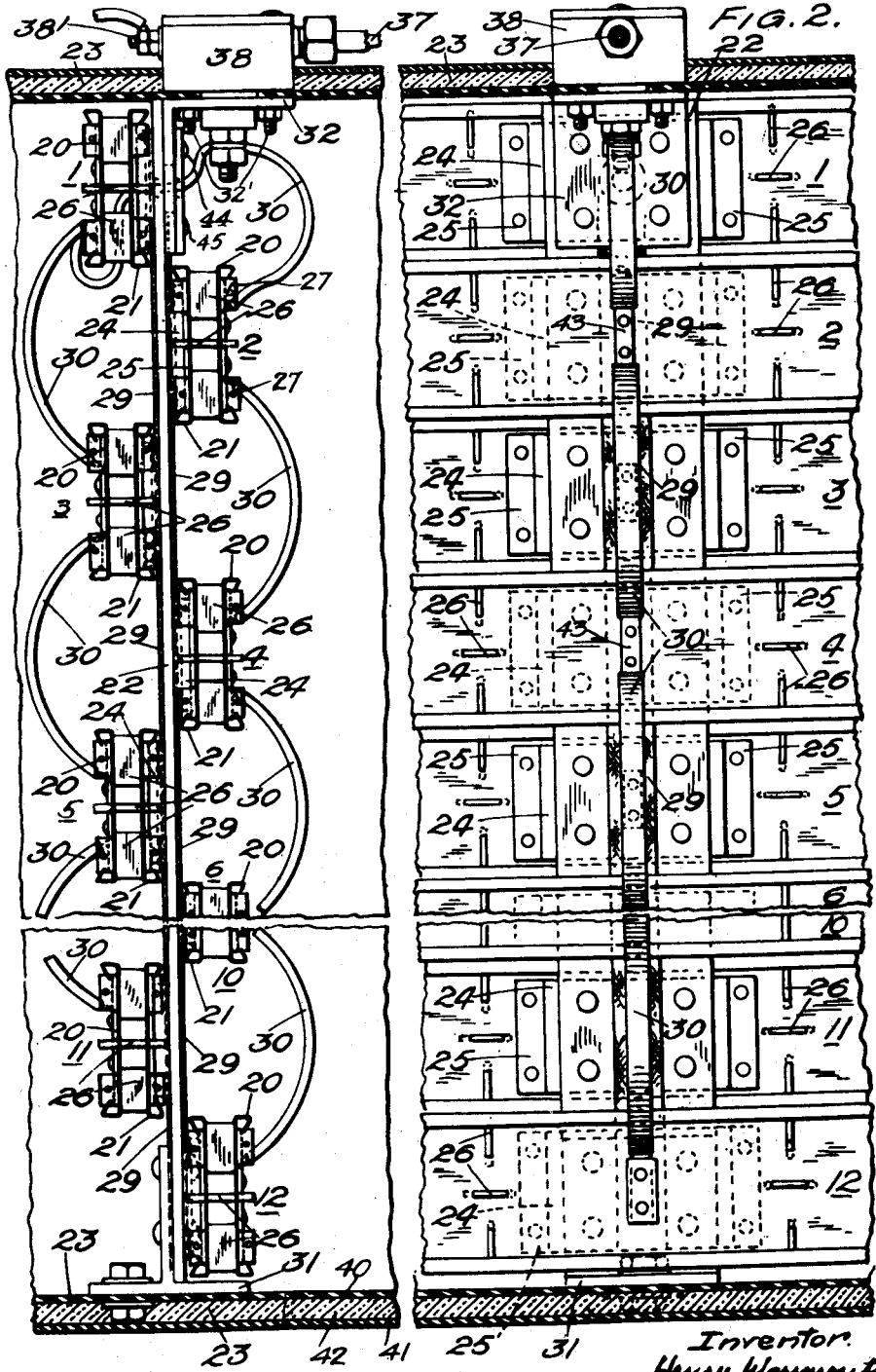

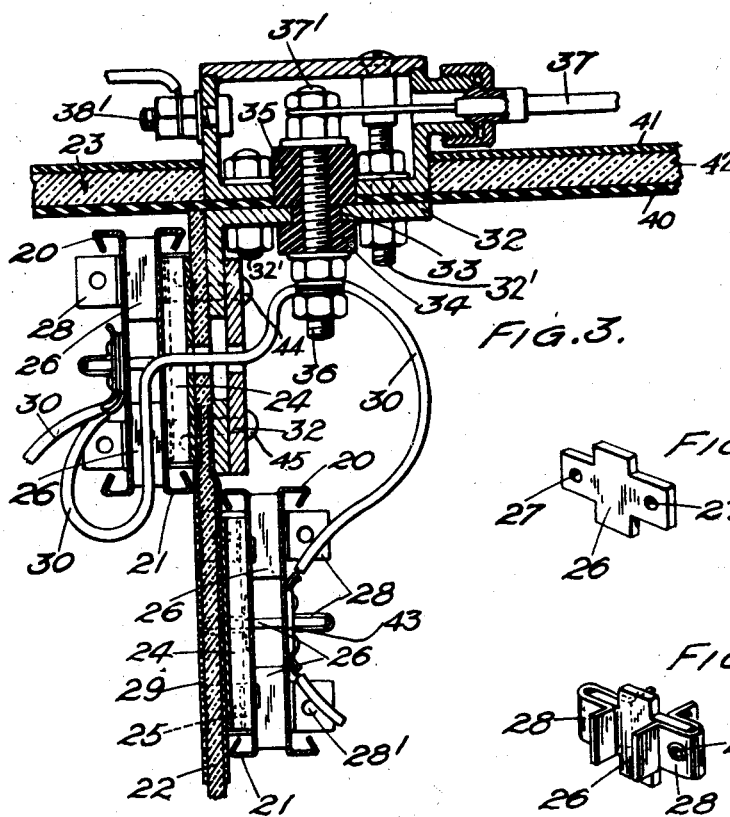
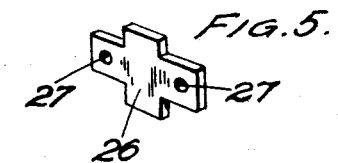
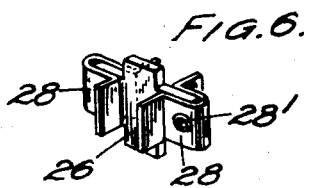
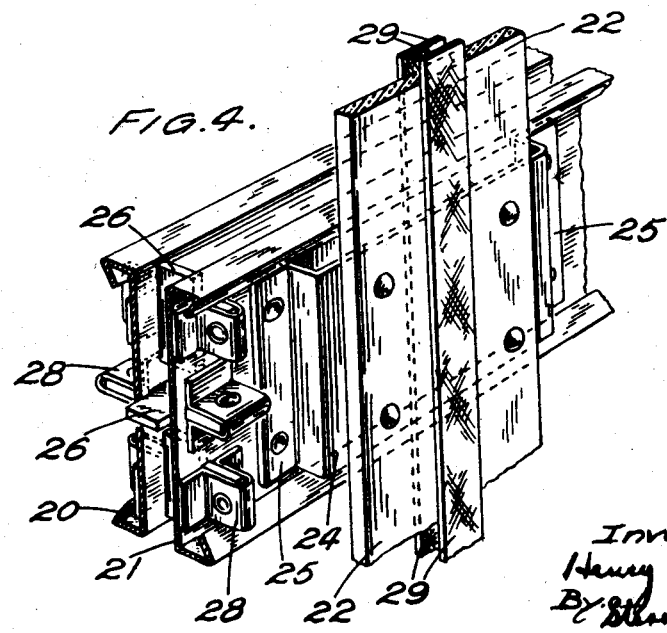

2,428,898

UNITED STATES PATENT OFFICE 2,428,898

ELECTRICAL CONDENSER FOR LIQUID VOLUME INDICATORS

Henry Waymouth, Harrow, England, assignor to Waymouth Gauges and Instruments Limited, Harrow, Middlesex, England Application December 30, 1944, Serial No. 570,693
In Great Britain December 30, 1943

16 Claims. (Cl. 175—41)

This invention relates to electrical condensers for liquid volume indicators and more particularly to liquid fuel tank condensers for electrical fuel contents gauges.

Electrical fuel contents gauges for indicating the volume of liquid fuel in fuel tanks, more especially for aircraft, have previously been proposed. For example, our patent specification No. 513,771 relates to the known type of liquid volume indicator in which the gauge reading varies with the capacity of a condenser within the tank, the capacity of the condenser in turn depending upon the extent to which the condenser is immersed by the liquid in the tank.

It is an object of the present invention to provide an improved electrical condenser for a liquid volume indicator which is especially adapted for use in a flexible fuel tank such as the rubber or like tanks which are now in use in aircraft.

It is a further object of the invention to provide a fuel tank condenser for an electrical fuel contents gauge, which condenser can be inserted and mounted in a substantially closed flexible tank to form therein a partition of substantially the same shape and size as the cross sectional area of the tank.

A further object of the invention is to provide an improved device for quickly assembling the plates of an electrical condenser in proper spaced relationship.

The foregoing and other objects of the invention will be made clearer with the aid of the following description relating to the accompanying drawings, in which:

Figure 1 is an interrupted vertical section through a self-sealing petrol tank such as is used in aircraft fitted with a liquid volume indicator comprising an electrical condenser made according to the invention;

Figure 2 is a part side view of Figure 1;

Figure 3 is an enlarged sectional view of the upper part of Figure 1 illustrating the manner in which the condenser is secured at one end, and the connection of the condenser to an outside terminal;

Figure 4 is a perspective detail view illustrating the assembly of the condenser plates;

Figures 5 and 6 are respectively detail views illustrating a spacing member and the means for securing it to a condenser plate;

Figure 7 is a diagram illustrating the electrical connections of the condenser plates;

Figure 8 illustrates the condenser in a collapsed or folded condition ready for insertion in one of the hand holes of an aircraft petrol tank; and Figure 9 is a complete small scale elevation of the condenser.

Referring to the drawings the plates of the condenser consist of two series 20, 21, of substantially rigid metal plates or strips preferably of a light metal or alloy such as aluminium or duralumin. The plates 20 of one series constitute the outer plates of twelve elemental condensers denoted respectively by the numerals 1—12 and the plates 21 of the other series constitute the inner plates of these elemental condensers, all the plates 20, 21 being channel-shaped for strengthening purposes. The condensers 1—12 formed by the plates 20, 21 are secured at intervals along their length on lengths of flexible belting such as 22, adapted to be secured at their ends to the self-sealing petrol tank 23 comprising layers of rubber and rubberised fabric such as, an inner synthetic rubber and canvas composite petrol tight layer 40, which provides the main strength of the tank, an intermediate rubber self-sealing layer 42 which when wetted by the petrol expands and fills any small holes, and an outer protecting rubber layer 41. The means for securing the condensers 1—12 to the belt comprise shallow metal trough-shaped fixing plates 24 riveted to the belt 22 and having horizontal flanges 25 by means of which they can be riveted or otherwise secured to the inner condenser plates 21. The outer plates 20 are connected to the inner plates by means of spacing members such as shown in Figure 5. As shown in this figure the spacing member 26 is cruciform, having two opposite arms apertured as at 27. These apertured arms project respectively through slots provided therefor in the plates 20, 21 and are secured by means of flanged U-shaped clips 28 having apertures 28' coinciding with the apertures 27 whereby they can be secured in position by eyelets or other suitable means. The cruciform members 20 can suitably be stampings of sheet synthetic resin conveniently reinforced with linen or other textile material. The clips 28 may conveniently be made of springy brass, the flanges thereon acting in the manner of leaf springs to hold the plates firmly against the central portion of the member 26, thereby preventing rattling of the parts and at the same time permitting expansion and contraction to take place freely.

The spacing members 26 are preferably arranged, as shown in Figure 4, so that their planes extend alternately in different directions, preferably at right angles, in order to increase the stability of the structure.

To each side of the belt is secured a strip 29 of light gauge metal braid against which the fixing plates 24 are pressed in such a manner as to provide good electrical contact, thereby ensuring that all the inner plates 21 are electrically connected to the braid 29. The outer plates 21 are also electrically connected together by strips 30 of light gauge braid enclosed in an insulating sleeving and connected to the outer plates by plates 43 screwed or riveted to the outer plates 20.

Each belt 22 is secured at the bottom to a fixing bracket 31 of inverted T-shape which in turn is secured to the inner layer 40 of the tank. At the top each belt 22 is fastened to an L-shaped fixing bracket 32 secured to the wall of the tank by bolt 32', one such bracket having an aperture to receive the waist 33 of an insulating bush comprising an inner part 34 and an outer part 35. A bolt 36 is screwed into the bush 34, 35 and is electrically connected at its inner end to the braid 30 and at its outer end constitutes a terminal 37' for a lead-in conductor 37. The terminal 37' is enclosed in a terminal box 38, which is bolted to the bracket 32 by the bolt 32' and provided with a second terminal 38'.

Electrical connection between the terminal 38' and the inner plates 21 of the condensers is provided by the terminal box 38, bolts 32', plate 32 and bolts 44, 45 (Fig. 3) constituting conductors between the inner plate 21 of the top elemental condenser (in electrical contact with the conducting strip 29) and the plate 32.

Suitable electric leads are provided for connecting the terminals and each series of plates associated therewith to the electrical circuit of the indicator outside the tank.

It will be evident from the foregoing and from the diagram of Figure 7 that the elemental condensers 1—12 are connected in parallel.

The staggered relationship of the elemental condensers 1—12 on opposite sides of the belt 22 permits the arrangement to be folded up or collapsed into small compass as shown in Figure 8 so that it can be passed into the interior of the petrol tank through one of the hand holes usually provided and denoted by 39 in Figure 8. After insertion it is opened out and secured in the manner described, the handholes being subsequently closed, for example by rubber discs clamped between metal plates.

It is to be understood that the invention is not limited to the particular construction described. For example, the shape of the plates 20, 21 may be varied to suit the cross-sectional shape of the tank and one or more condensers may be used in a single tank.

What I claim is:

1. An electrical condenser comprising a flexible support, a plurality of elemental condensers mounted on said support, and means for electrically connecting said condensers in parallel, wherein the plates of each elemental condenser are spaced apart by cruciform spacing members of insulating material, opposite arms of which project through slots in the plates and are secured therein by clips arranged for connection to said projecting arms.

2. An electrical condenser according to claim 1, wherein the spacing members are stamped from a sheet of insulating material.

3. An electrical condenser according to claim 1, wherein the projecting arms of the spacing members, and the securing clips, are apertured to receive eyelets, and the clips are made of springy material and have flanges bearing on the plates.

4. An electrical condenser according to claim 1, wherein the spacing members associated with any one pair of plates are arranged to extend in different directions to increase structural stability.

5. A flexible liquid fuel tank fitted with an electrical condenser according to claim 12.

6. Means for assembling the plates of an electrical condenser in spaced relationship comprising a cruciform spacing member of insulating material, one pair of arms of the spacing member being adapted to project through openings in the plates and being secured by clips.

7. Means according to claim 6, wherein the clips are of U-shape and embrace the projecting arms, and the securing means comprise apertures provided in the extending arms, in line with similar apertures provided in the walls of the clips, to receive eyelets or like securing means.

8. Means according to claim 6, wherein the spacing members are stamped from sheet insulating material.

9. Means according to claim 6, wherein the clips are made of springy metal and are formed with flanges bearing against the condenser plate for the purpose specified.

10. An electrical condenser for a liquid volume indicator comprising a flexible support, a plurality of elemental condensers mounted on opposite sides of said support, the condensers on one side being out of alignment with the condensers on the other side, each of said condensers comprising two plates in spaced relationship, and means for electrically connecting all said condensers in parallel.

11. An electrical condenser for a liquid volume indicator, comprising a flexible support, a plurality of elemental condensers mounted on opposite sides of said support, the condensers on one side being out of alignment with the condensers on the other side, each of said condensers comprising two plates in spaced relationship, means for electrically connecting all said condensers in parallel, and means associated with said flexible support for fixing said support inside the wall of a vessel.

12. An electrical condenser for a liquid volume indicator comprising a flexible support, a plurality of elemental condensers mounted on said support, means for electrically connecting said condensers in parallel, and means associated with the ends of said flexible support for fixing to, and extending said support between, the inner surfaces of the top and bottom of a vessel.

13. An electrical condenser for a liquid volume indicator comprising a flexible support, a plurality of elemental condensers mounted on at least one side of and along the length of said support, each of said condensers comprising two plates in spaced relationship, and means for electrically connecting said condensers in parallel, the arrangement being such that the composite condenser can be folded into a relatively small compass when not in use, and unfolded to space the said elemental condensers when set up for use.

14. An electrical condenser according to claim 13 comprising a plurality of elemental condensers mounted on opposite sides of said flexible support.

15. An electrical condenser according to claim 11 wherein said elemental condensers are secured to said flexible support by means of rigid metal fixing plates.

16. A vessel fitted internally with an electrical condenser according to claim 11, wherein one series of like plates of the condenser are electrically connected through fixing plates to flexible conducting strips secured on both sides of said flexible support, said strips being electrically connected to a terminal on the wall of the vessel, and the other series of like plates are electrically connected to a second terminal by a flexible conducting member or members.

HENRY WAYMOUTH.

REFERENCES CITED

The following references are of record in the file of this patent:

UNITED STATES PATENTS

| Number | Name | Date |
|---|---|---|
| 2,216,559 | Ortlieb | Oct. 1, 1940 |
| 2,022,367 | Carbonaro | Nov. 26, 1935 |

FOREIGN PATENTS

| Number | Country | Date |
|---|---|---|
| 1,136 | Great Britain | 1905 |